(12) United States Patent
Carter

(10) Patent No.: US 6,665,656 B1
(45) Date of Patent: Dec. 16, 2003

(54) METHOD AND APPARATUS FOR EVALUATING DOCUMENTS WITH CORRELATING INFORMATION

(75) Inventor: Jeffery L. Carter, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/413,089

(22) Filed: Oct. 5, 1999

(51) Int. Cl.[7] .............................................. G06F 17/30
(52) U.S. Cl. .......................................... 707/3; 707/102
(58) Field of Search ................................ 707/3–6, 102

(56) References Cited

U.S. PATENT DOCUMENTS

| | | | | |
|---|---|---|---|---|
| 5,950,214 A | | 9/1999 | Rivette et al. ............... 707/512 |
| 6,038,561 A | * | 3/2000 | Snyder et al. .................. 707/6 |
| 6,067,539 A | * | 5/2000 | Cohen ............................ 707/2 |
| 6,233,575 B1 | * | 5/2001 | Agrawal et al. ................ 707/6 |
| 6,289,338 B1 | * | 9/2001 | Stoffel et al. ................... 707/3 |
| 6,405,190 B1 | * | 6/2002 | Conklin .......................... 707/3 |
| 6,424,973 B1 | * | 7/2002 | Baclawski .................... 707/102 |
| 6,460,034 B1 | * | 10/2002 | Wical ............................. 707/5 |
| 6,498,795 B1 | * | 12/2002 | Zhang et al. ................ 370/400 |

OTHER PUBLICATIONS

"Frequently Asked Questions About MAPIT", Manning & Napier Information Services. pp. 1–6. 1998.*
Feldman, "Testing Natural Language" A Reprint from ONLINE, 8 pages. 199?.*
Stobbs, "Turning the Corporate Patent Portifolio Using the Latest Software Tools" MAPiT Briefing Report Information Servecies. 4 pgs. 1997.*
"Let Others Sift Data—You Want Knowledge". Manning & Napier Information Services. 8 pgs.*
"Frequently Asked Questions About MAPIT[SM]," Manning & Napier Information Services, pp. 1–6 (1998).
"Breakthrough Combination of Chemical Structure and Natural Language Patent Systems," Manning & Napier Information Services, 3 pgs. (1998).
Mogee, "Patent Analysis Methods in Support of Licensing," Technology Transfer Society Annual Conference, pp. 1–10 (1997).
Stobbs, "Tuning the Corporate Patent Portfolio Using the Latest Software Tools," MAPiT Briefing Report Information Services, 4 pgs. (1997).
"Patent Data Mining Tool Now on the Web," Manning & Napier Information Services, 3 pgs. (1997).
"Manning & Napier Information Services and Jnana Technologies Offer Breakthrough Product for Preventing Patent Infringement Lawsuits," Manning & Napier Information Services, 2 pgs. (1997).
Allen, "Ambiguity Resolution: Statistical Methods," Chapter 7, Natural Language Understanding, pp. 189–222 (1995).
Allen, "Semantics and Logical Form," Chapter 8, Natural Language Understanding, pp. 227–260 (1995).
"Testing Natural Language," A Reprint from Online, 8 pgs Date Unknown.
"Intelligent Text Data Mining," Manning & Napier Information Services (2 pgs.).
"Let Others Sift Data—You Want Knowledge," Manning & Napier Information Services, 8 pgs.

* cited by examiner

Primary Examiner—Jack M. Choules

(57) ABSTRACT

A method for producing correlating information with respect to a target document, the method including providing a target document, the target document including patent content; processing the target document to obtain an information structure; producing a search criteria from the information structure; searching computer readable media based upon the search criteria to obtain search material; and comparing the search material to contents of the target document to produce the correlating information. An apparatus for using the method is also disclosed.

25 Claims, 8 Drawing Sheets

PATENT VALUE INDICATOR 300

| PATENT NUMBER 302 | VALUE INDICATOR 304 | APPLICATION DATE 306 | PATENT/FAMILY 308 | FILLING DATE 310 | COMMITTEE RANK 312 | CITATIONS 314 |
|---|---|---|---|---|---|---|
| US5119485 | 20643 | 920602 | 1 | 890515 | 3 | 86 |
| US4763305 | 13270 | 880809 | 1 | 851127 | 2 | 55 |
| US4633437 | 12703 | 861230 | 9 | 840626 | 3 | 34 |
| US4661192 | 10453 | 870428 | 1 | 850822 | 2 | 43 |
| US4752871 | 8545 | 880621 | 1 | 850930 | 2 | 35 |
| US4621315 | 8191 | 861104 | 1 | 850903 | 3 | 22 |
| US4837184 | 7439 | 890606 | 5 | 880104 | 3 | 28 |
| US4763250 | 7152 | 880809 | 1 | 850401 | 3 | 19 |
| US4948745 | 7118 | 900814 | 1 | 890522 | 3 | 29 |
| US4794558 | 6843 | 881227 | 6 | 860925 | 3 | 21 |
| US4926237 | 6780 | 900515 | 1 | 880404 | 2 | 37 |

*FIG. 3*

SOME SIGNIFICANT RESEARCH TOWARD RESOLVING W-ATM LAYER ONE ISSUES IS IN THE AREA OF DIVERSITY RECEPTION LIKE ANTENNA ARRAYS AND SDMA, ALREADY MENTIONTED IN THIS CHAPTER. DIVERSITY RECEPTION TECHNIQUES SOLVE SOME OF THE ISSUES THAT W-ATM IS FACING, LIKE FADING AND MULTI-PATH PROPAGATION. MULTIPLE RECEIVED SIGNALS CAUSED BY MULTIPATH PROPAGATION, RECEIVED AT ANTENNAS SPACED AT A DISTANCE OF A FRACTION OF THE WAVELENGTH, ALLOWS THE RECEIVED SIGNALS TO BE TREATED AS INDEPENDENT RAYS. STATISTICALLY, ONE OF THE RECEIVED SIGNALS AT A GIVEN POINT WILL NOT HAVE FADED, THEN BY USING DIVERSITY COMBINING, THE STRONGEST PORTION OF THE TWO INDEPENDENT SIGNALS, ARE USED TO CREATE A THIRD SIGNAL, PARTIALLY ELIMINATING THE EFFECTS OF MULTIPATH PROPAGATION AND FADING. DIVERSITY COMBINING ALSO ALLOWS THE MOBILE TERMINAL TO REDUCE THE TRANSMIT POWER, SOMETHING BATTERY RESEARCHERS LIKE TO HEAR.

HIGHER FREQUENCIES AND WIDE BANDS ARE CAPABLE OF DELIVERING THE NEEDED THROUGHPUT RATES EXPECTED OF AN ATM NETWORK. INTERFERENCE AND OTHER LAYER ONE ISSUES AT HIGHER FREQUENCIES ARE MINIMIZED BY DECREASING THE TRANSMISSION DISTANCE BETWEEN THE MOBILE TERMINAL AND THE BASE STATION, THEREBY IMPROVING BER AND QOS. GIVEN THE BANDWIDTH, BER, AND QOS REQUIREMENTS OF AN ATM NETWORK, W-ATM WILL BE DEPLOYED FIRST IN THE PRIVATE AND PUBLIC PICO CELL INFRASTRUCTURE OR IN HIGHER POPULATED AREAS, I.E. INDOOR WIRELESS LANS OR SYSTEMS LIKE JAPAN'S PHS INFRASTRUCTURE.

JAPAN HAS THE ADVANTAGES OF ALREADY HAVING A PUBLICY-DEPLOYED PICO CELL NETWORK AND THE POPULATION DENSITY TO MAKE A PICO CELL NETWORK FINANCIALLY POSSIBLE (THE PHS NETWORK DEPLOYED ON AN ISLAND WHERE 125 MILLION PEOPLE ARE PACKED INTO AN AREA SLIGHTLY SMALLER THAN THE SIZE OF CALIFORNIA). WITH A PUBLICLY-DEPLOYED PICO CELL NETWORK, THE EVOLUTION TO W-ATM WILL BE SWIFT AND DECISIVE. IN THE YEAR 2002, JAPAN WILL BE FULFILLING THE MOBILE MULTIMEDIA DREAM WITH 10 MBPS WIRELESS ATM LINKS.

*FIG. 7*

| GRAPHICAL REPRESENTATION OF THE RETRAINING AND SELECTION AREA | | | |
|---|---|---|---|
| POTENTIAL INVALIDATING OR INFRINGING ART | RELEVANCE RANKING 902 | USER RANKING 904 | OTHER INFORMATION |
| PATENT A | 1.000 | 3 | |
| TECHNICAL PAPER | 0.88 | 1 | |
| PATENT B | 0.85 | 1 | |
| PATENT C | 0.75 | 2 | |
| TECHNICAL PAPER | 0.62 | 3 | |
| PATENT D | 0.60 | 3 | |
| DATA BOOK | 0.42 | 2 | |
| NEWS ARTICLE | 0.41 | 1 | |
| IEEE BOOK | 0.32 | 1 | |

METHOD AND APPARATUS FOR EVALUATING DOCUMENTS WITH CORRELATING INFORMATION

FIELD OF THE INVENTION

The present invention relates to a method and apparatus for locating documents with a high level of correlating information to a target document that includes patent content.

BACKGROUND OF THE INVENTION

In industry, there is a general need to acquire and determine the value of business assets. As an example, there is a need to determine the value of intellectual property assets, such as patents. It is also important to efficiently and effectively leverage such valuable assets in the worldwide marketplace. As another example, a company would benefit from better identifying research and development (R&D) expenditures that need to be productized within certain marketing time periods.

In general, corporations have numerous assets and revenue potentials that require independent and effective management. Taking the example of a patent portfolio, a single company may have thousands of issued patents in hundreds of different technological areas. One method of managing such a large patent portfolio, includes training and utilizing human resources in order to employ a manual management approach. Such a manual approach is time consuming, prone to human error, not timely in its execution, costly, and resource limited. While large searchable computer databases may be helpful for managing corporate assets like patents, such databases are passive engines that are only as good as their user's intuition and knowledge base, and these databases typically have interfaces that require a significant amount of costly human interaction.

Accordingly, there is a need for an improved methodology for managing corporate assets, such as a large patent portfolio or R&D expenditures.

BRIEF DESCRIPTION OF THE DRAWINGS

Many features and advantages of embodiments of the present invention may be more clearly understood from the following detailed description taken in conjunction with the accompanying FIGURES where like numerals refer to like and corresponding parts and in which:

FIG. 3 illustrates, in a table, rank-ordered valuation output produced by the method of FIG. 1.

FIG. 7 illustrates, in a block diagram, a portion of a textual document, which may be analyzed for detection of correlation information per the method of FIG. 5.

DETAILED DESCRIPTION OF THE DRAWINGS

Generally, FIGS. 1–10 describe a method for evaluating a tangible or intangible asset, such as a patent, a plurality of patents, a patent portfolio, a technology market, a business plan, research and development (R&D) expenditures, a specific product line or product family, a market opportunity, a trade secret, or a like tangible or intangible business asset. The one or more assets to be valuated are identified or provided wholesale, referenced, or provided in part to a computer tool. The tool retrieves information related to the asset from the Internet, local databases, local area networks, wireless sources, banks of tape or hard drives, optical storage, the asset itself, or other computer readable medium. The tool then processes and/or uses the asset information for evaluation. Generally, this automated, intelligent asset method enables assets, such as patents, to be evaluated in an improved manner that may be less time consuming, less prone to human error, more timely in its execution, less costly overall, and/or less resource limited than conventional human-intensive and management methods.

Figure 1:
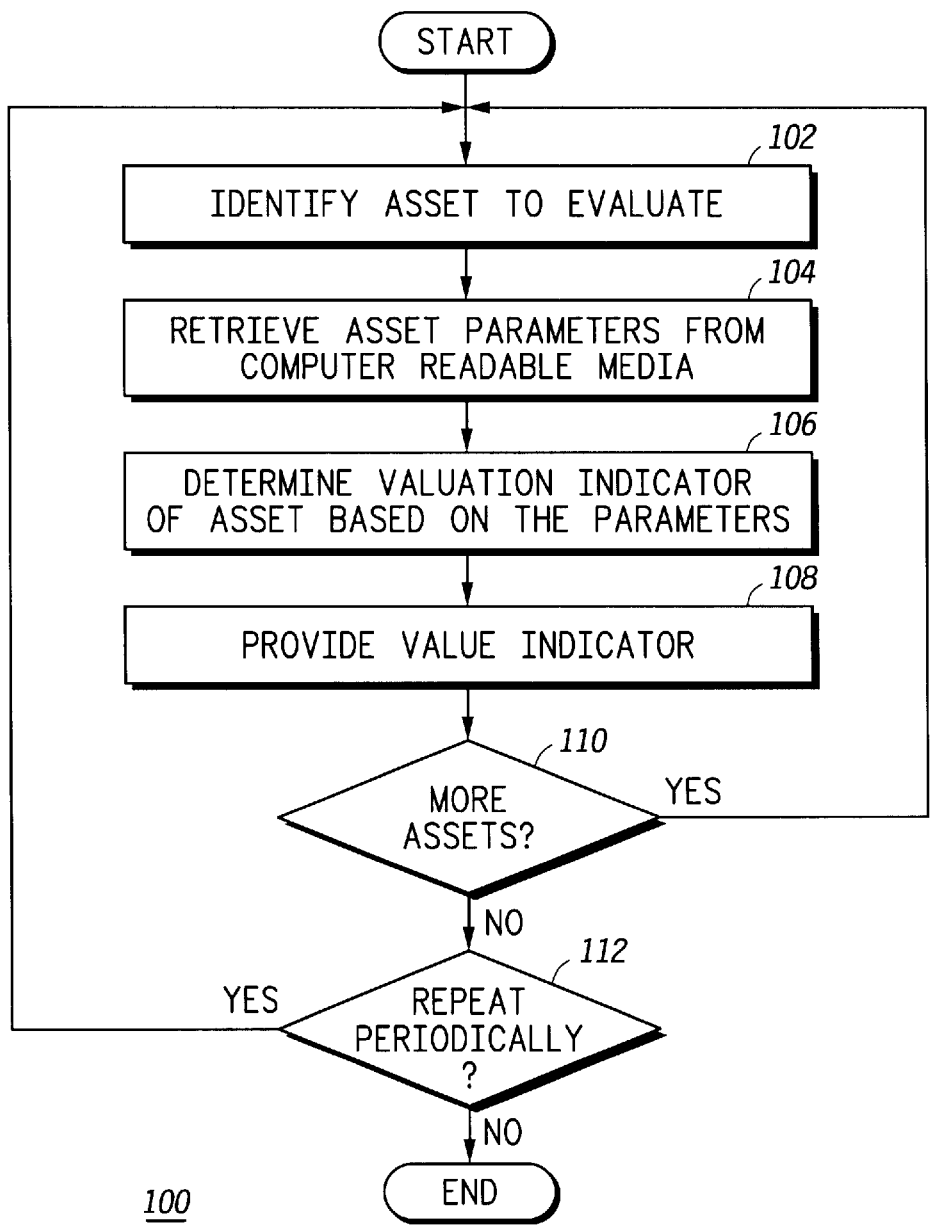
FIG. 1 illustrates, in a flowchart, a method for valuating an asset, such as a patent application or an entire patent portfolio.

FIG. 1 illustrates a method 100 that is used to calculate the value of a tangible or intangible asset owned or controlled by a corporation, individual, or other entity. The method 100 of FIG. 1 may be used to determine a value of a utility patent, utility model, design patent, or like legal document within the worldwide market or other geographic area. In other embodiments, the asset that can be analyzed via the method of FIG. 1 may be a trade secret, trademark, other intellectual property asset, a specific category of technology (e.g., ADSL, copper interconnects, cellular phones, etc.), a specific technical publication, a specific product or product line, research and development expenditure, or other asset whose valuation could assist business managers in rendering improved present and/or future decisions. Generally, the method 100 is performed on a general-purpose computer utilizing hardware and/or software valuation methods. In other forms, a special purpose computer or other computing apparatus may be used to execute the method 100 of FIG. 1.

Methodology 100 begins by identifying the asset to be evaluated, step 102. In the case of patent valuation, the input provided, via step 102, may be a patent number (such as U.S. Pat. No. 5,026,231 or JP 5-11101), a serial number of the patent (such as Ser. No. 08/234,567), or a like identifier. The patent may be issued, pending a filing at a patent office, or already filed and pending at a sovereign patent office (e.g., USPTO). In other embodiments, the step 102 may require entry of other information such as an inventor name, an assignee, various dates, and/or the like. Required information may vary from country-to-country as each sovereign nation may require different material to uniquely identify an asset. In the case of non-patent related valuation, any data which can be used to definitively identify the asset or the general category of a plurality of assets may be entered via the step 102. For example, a publication site, a marketing report, a purchase number, a product data book segment, a part number, or like info may be needed to identify the asset. In another form, the entire asset itself may be provided as input in step 102. For example, an entire electronic patent specification may be provided as input via the step 102.

In step 104, the asset identification data, from step 102, is used to retrieve parameters related to the asset from one or more computer readable mediums. For example, the step 104 may involve using the data from step 102 to traverse a plurality of Internet pages or Internet databases in order to obtain information on the asset or to obtain an electronic copy of the asset itself. In other forms, local area networks (LANs) may also be searched including local servers, local databases, local disk drives, patent docketing systems, and local user input devices/terminals. Information may also be generated from a wide area network (WAN), satellite network, wireless infrastructure, or any other media that is readily accessed by a computer. Commercial or publicly available databases such as web pages, Dialog databases, USPTO patent databases of the WWW, or other computer available information could be accessed to retrieve asset parameters via the step 104.

In the specific example of an issued US Patent which is being evaluated, the step 104 may select from one or more objective and/or subjective data parameters on the computer readable medium. Objective parameters include those parameters that are usually readily available automatically on some computer readable medium without significant subjective human intervention. For example, one objective target patent parameter is a patent family number (pf). A target US Patent may only be filed in the US where no sibling patent applications were subsequently filed, claiming priority on the US patent, in any foreign country. The value pf in this case, is a value of one. In another circumstance, a single US patent may also be filed in twenty or thirty other foreign countries whereby the number of patents in this patent family is twenty to thirty (e.g., pf=20). The patent family value (pf) may be indicative of the asset's value, which is a patent value in this circumstance.

In addition to patent family information, the number of times a particular patent is cited as prior art against a subsequently filed patent is also objective and useful information that can be readily obtained from computer readable locations. The number of citations (c) may be used to indicate a relative value of a particular patent under a theory that a patent that is cited often as prior art is more likely to be used by others. Another parameter that may also be used in the assessment of a particular US or international patent is the total life of the patent document lp). In the case of a United States patent, the life of a patent is generally 20 years from the date of filing of the patent. A patent having a longer life or longer remaining life may be more valuable than a patent having a shorter life span. Other objective information that may be used to derive a patent valuation is the present date of the patent's evaluation (pd), the filing date of the target patent (fd), the array of citation dates (cd) that are associated with the one or more prior art citations to the target patent of interest, and the like. Other objective parameters may exist for other types of assets where these parameters may be obtained in publicly available databases, the Internet, or elsewhere.

Subjective information that may be indicative of value may include a corporate patent committee ranking (cr), which is an internal corporation's management assessment of the relative value of the patent at a particular point in time. In addition, a portfolio manager, a patent business manager, or a patent attorney may provide, in a database or a local server, one or more additional subjective evaluation parameters such as numerical indications of: (1) the relative claim breadth of the patent; (2) the scope of use of the patented invention by the assignee corporation; (3) the use of the invention by competitors; (4) the ease of detectability of infringement of the patent; (5) the ease in which the invention is implemented in manufacturing and marketing (e.g., severity of cost or technology barriers to implementation); (6) the strategic nature of the patented invention (e.g., it is the only patent covering a major product line); (7) the monetary worldwide royalty base of the patented invention (e.g., a total available market (TAM) of one billion US dollars); (8) the limits of the invention to specific regions or global geographic areas(e.g., GSM used primarily in Europe); (9) the ease in which the patent can be designed around by a competitor; (10) the adoption of the invention by one or more standards bodies; (11) the perceived closeness of applicable prior art; (12) the perceived longevity of the technology contained within the patent (e.g., a short lived technology that is soon replaced by other technology may not be as valuable); or other subjective parameters that may be retrieved. Other subjective parameters may be applicable to other types of assets being evaluated.

As discussed above, many parameters may be retrieved, at step 104, from one or many different sources. It is important to note that some corporations, individuals, or legal entities will value patents in different manners. In addition, different industries may correlate different objective and/or subjective patents more strongly to "patent value". Therefore, the specific access, arrangement, and mathematical interrelationships of the various objective and subjective parameters discussed herein, as well as those not specifically listed herein, may vary widely from industry-to-industry, may vary over time as technology and business conditions change, and may even differ between companies in the same industry that have a different market focus or technology roadmap.

After retrieving asset parameters via step 104, a determination of the value of the asset is made based upon the extracted parameters. The parameters retrieved from step 104 are mathematically analyzed to result in a valuation estimate or valuation indicator, via step 106. In the illustrative case of a patent document in the semiconductor industry, while many different permutations of value equations are available, it was found that a good indicator of patent value may be obtained by one or more of the following illustrative formulas:

$$cr*((c+N)*(((pd-fd/M)-(pf+J)))=\text{patent value score} \quad (1)$$

wherein:
cr=patent committee corporate rank of value of patent
pf=patent family (number of patents in family)
c=citations (number of citations citing to the patent)
pd=present date
fd=filing date of target patent
J=any constant with a value of roughly 20 being preferred
N=any constant with a value of roughly 1 being preferred
M=a constant with a value of roughly 1000 being preferred $$mt*((c+N)*(((pd-fd/M)-(pf+J)))+\text{patent value score} \quad (2)$$

wherein:
mt=maintenance fee payments on patent
pf=patent family (number of patents in family)

c=citations (number of citations citing to the patent)

pd=present date fd=filing date of target patent

J=any constant with a value of roughly 20 being preferred

N=any constant with a value of roughly 1 being preferred

M=a constant with a value of roughly 1000 being preferred $$mt*((cd+N)*(((pd-fd/M)-(pf+J)))=\text{patent value score} \quad (3)$$

wherein:

mt=maintenance fee payments on patent pf=patent family (number of patents in patent family)

cd=citation distribution, which is a curve fit, distribution analysis or other calculation based on the citation distribution over time pd=present date fd=filing date of target patent J=any constant with a value of roughly 20 being preferred N=any constant with a value of roughly 1 being preferred M=a constant with a value of roughly 1000 being preferred $$\text{patent value score}=2*d+2*rb+1.5*da+cb+eoi \quad (4)$$

wherein:

d=detectability of the patent rb=the market royalty base of the invention da=the difficulty with which the invention may be designed around by competitors cb=claim breadth eoi=ease of implementation of invention (technology barriers+financial barrier to adoption of invention)

While specific formulas for patent valuation using mixtures of subjective and/or objective evaluation criterion are discussed directly above, many different mathematical relationships, variables, and/or equations may be used via step 106 to derive an asset's estimated value.

After calculating a value indicator via step 106, the value indicator is provided to a computer readable medium and/or an end user for assessment and use, at 108. This indicator of the asset's value may be used by business management, an attorney, and/or technology managers in order to improve the asset-based decision making process within their organization. For example, applying the method of FIG. 1 may determine that the elements of a trade secret that was believed to be fully protected by a corporation have been discovered in the public domain whereby the trade secret protection has likely been lost and should not be litigated. In addition, the valuation of a patent may indicate that the patent should no longer be maintained through expensive maintenance fees. This method may be used to find several patents in a company's patent portfolio that should be asserted against competitors but had been overlooked. The difference between identifying a patent that is being infringed today versus finding it a few years later may provide significant revenue opportunity or other competitive advantages.

After generating a value indicator for a single asset, the method of FIG. 1 may be repeated for another asset or set of assets. Therefore, FIG. 1 incorporates the feature that the method 100 may be executed for a single asset, for a category of assets, or for an entire exhaustive set of assets associated with an entire legal entity, corporation, a market, an industry, an individual, or partnership. In addition, the valuation of a particular asset or set of assets may be reviewed periodically on an ongoing basis for comparison and detection of trends over time. For example, a company may be interested in whether or not the value of their patent portfolio is increasing over time or is decreasing over time on a month-by-month, quarter-by-quarter, or year-to-year basis. The method 100 allows for such time delays to be periodically incorporated or intermittently programmed on a periodic basis and can provide trends or progress reports to management, at step 112. The valuation results of this periodic or intermittent execution of the method 100 may be stored in a timeline database so that changes in the valuation of a particular asset or a set of assets can be analyzed over time. A corporation may also decide that they want to know how their patent portfolio compares to the portfolios or technology of their competitors or other industries. Such operations may be performed using the valuation method taught herein when applied to different assets.

A comparative study may indicate that the particular value of a particular area of technology (e.g. copper IC interconnects) has been rapidly increasing over time such that a corporation should consider such information when allocating resources and funding to related efforts. If resources are not proactively assigned, the company may fall behind the development curve and/or lose the ability to cultivate valuable Intellectual Property (IP) during development due to prior "dilution" of the R&D effort by their competitor's prior actions. The method 100 may be used to indicate that the value of a product in the marketplace is declining via a measured declining demand, reduced orders, etc. The detection of falling product value may allow a marketing manager to end-of-life a particular product or product line before sales of the product move into an unprofitable operational state. In addition, research, development, staffing, and productization are generally limited by resources whereby the value assessment method 100 of FIG. 1 may be used to identify certain potentially highly-profitable projects. Generally, the automated valuation process discussed with respect to FIG. 1 has many other useful applications.

Figure 2:
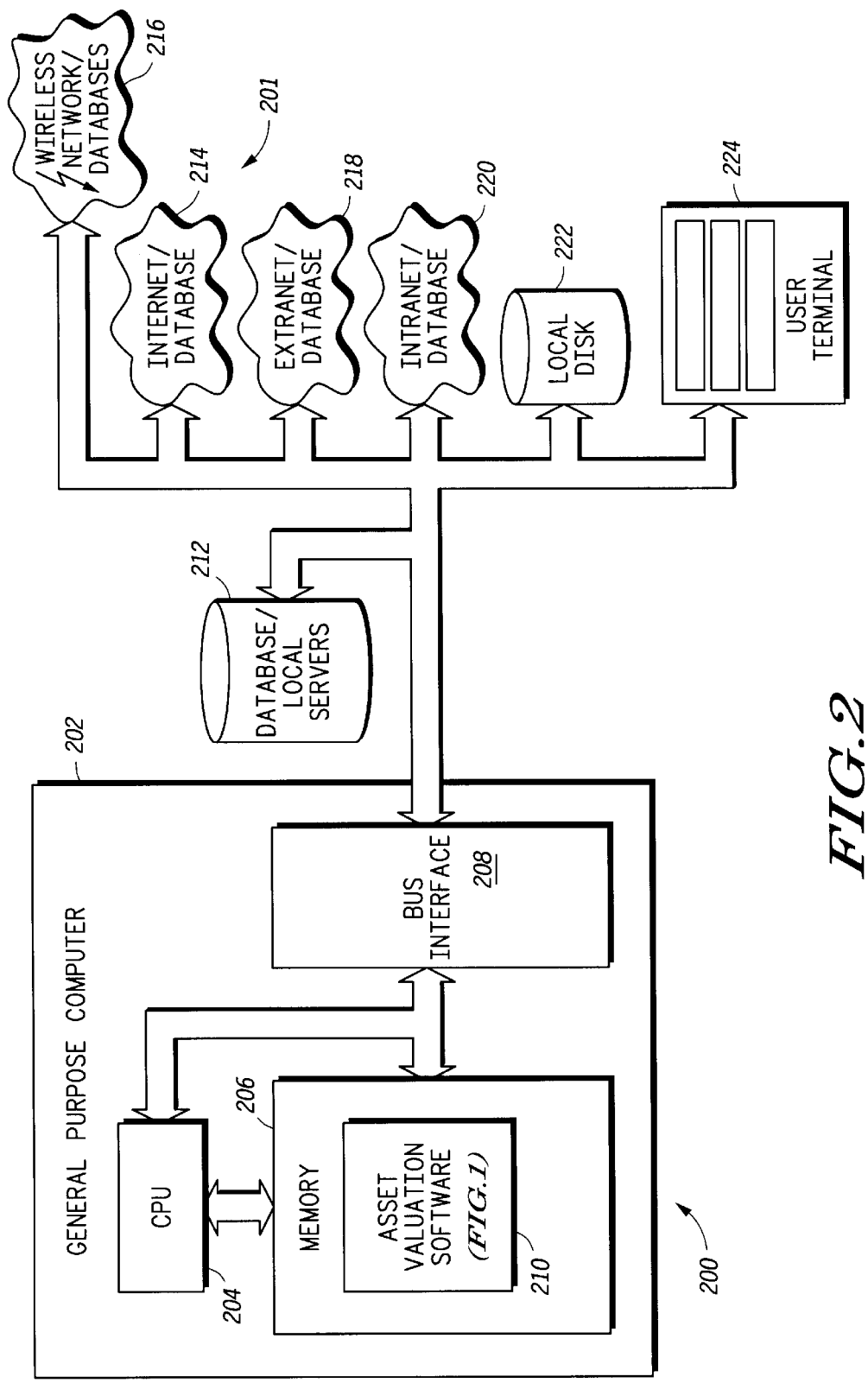
FIG. 2 illustrates, in a block diagram, a computer and network that may be used to implement the method illustrated via FIG. 1.

FIG. 2 illustrates a computer system 200 that may be used to implement the method 100 illustrated in FIG. 1. FIG. 2 illustrates a general-purpose computer 202 that contains a central processing unit (CPU) 204 that is coupled to computer readable memory 206. The CPU 204 may be any CPU that can execute computer instructions. The memory 206 is any computer readable set of one or more memory devices including, but not limited to, one or more of static random access memory, non volatile memory, dynamic random access memory, embedded DRAM, ferroelectric memory, ferromagnetic memory, optical disks, disk drives, tape storage, or like computer readable memory.

Within a portion of the computer readable memory is stored at least a portion of the asset valuation software 210 which executes software instructions that implement the method 100 illustrated in FIG. 1. The CPU 204 and/or the memory 206 is coupled to a bus interface unit 208 which allows the general purpose computer 202 to communicate with an external environment 201 in an input/output (I/O) manner. Generally, in order to output information to an external environment (e.g., step 102 of FIG. 1 or step 108 of FIG. 1) or to receive data as input (step 104 of FIG. 1), the CPU 204 and memory 206 can receive or communicate data, address, and/or control signals through the bus interface unit 208. These signals may be received and processed by one or more of a plurality of externally available information resources. FIG. 2 illustrates a specific subset of these available resources. Specifically, FIG. 2 illustrates local databases or local servers 212. In addition, FIG. 2 illustrates local disk drives or tape systems 222, and local user input devices or terminals 224. Various wide area networks (WANs) 216 and local area networks (LANs) as well as the internet 214, extranet and databases 218, and the various intranet nodes 220 may be accessed by the computer 202 running the method of FIG. 1. In addition, other methods of communicating information other than cable-based technology, copper communication (e.g., V.90, ADSL, ISDN, etc.), and the like may be used to communicate information as taught herein. Such other methods include wireless communication or optical protocols. To show other potential sources of information, a wireless network 216 is also illustrated in FIG. 2. The wireless network 216 may be a wireless internet system or a wireless communication system that communicates with personal handheld devices.

FIG. 3 illustrates a specific value indicator output table that may be provided in one circumstance by the method 100. FIG. 3 illustrates a table that contains eleven US patent applications in eleven different rows. FIG. 3 indicates that the number of prior art citations, an objective parameter, associated with each patent as indicated by the contents of column 314. In addition, column 312 of FIG. 3 indicates that a subjective parameter such as an attorney ranking or a patent committee ranking has been accessed. Table 300 illustrates that the filing date information has also been accessed as indicated in column 310 of FIG. 3. The number of foreign filed applications for each patent are indicated in column 308 of FIG.3. A final piece of objective information is the application issuance date indicated in column 306 of FIG. 3. FIG. 3 indicates that the information from columns 306 through 314, as obtained by step 104 of FIG. 1, is processed as described by step 106 to obtain a value indicator as shown in column 304 of FIG. 3.

As discussed previously, any one or more of a number of patent valuation equations and objective and/or subjective input criteria may be analyzed by the process of FIG. 1 to arrive at the patent values illustrated in column 304. It is important to note that the particular mathematical relationship used in step 106 of FIG. 1 should be correlated to the personal experience and knowledge of business managers and patent attorneys associated with the assignee to improve the estimated value of the ranking system. The specific methodologies discussed herein were found to have acceptable correlation to value for certain patents in the integrated circuit industry.

Figure 4:
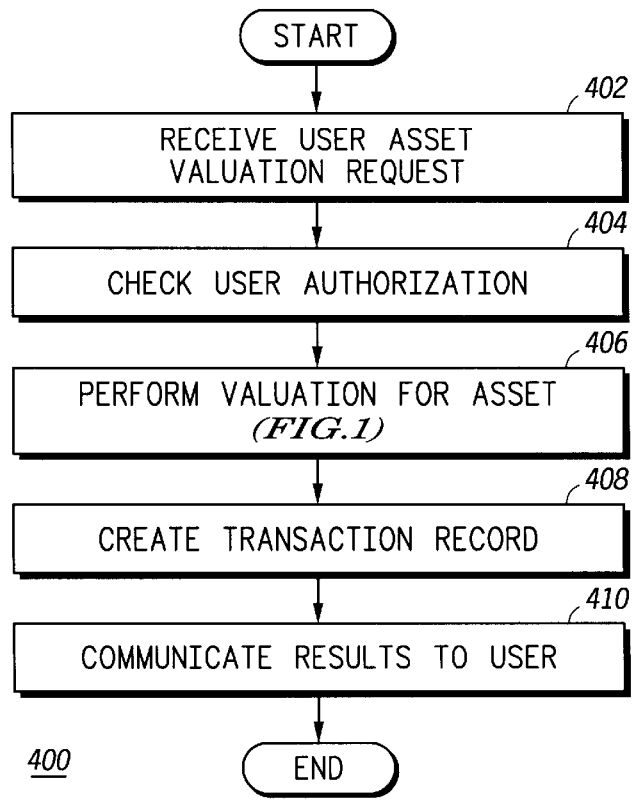
FIG. 4 illustrates, in a flowchart, an e-commerce method for performing the valuation method of FIG. 1.

FIG. 4 illustrates how the system of FIG. 2 may be used to form an internet web service or e-commerce business by executing the method of FIG. 1. The e-commerce method 400 begins via a website or like construct receiving a user asset valuation request, 402. This could be the faxing of information to a web site, an e-mail mailed to the cite's mail location, manual entry of fields on a web page graphical user interface (GUI) created by HTML code, voice recognition input schemes, or like methods which may be used to input information related to an asset into a computer system.

After receiving the asset value request and the asset information at step 402, a step 404 is processed to obtain user authorization. Generally, user authorization may include a password check, some sort of financial authentication, payment of e-cash, a billing procedure through stored billing records, and/or some sort of security verification such as finger print check, a signature verification, or like identification procedures. After a user has been properly authorized and optional financial arrangements have been made, the asset valuation method 100 is performed at step 406. The valuation for step 406 is performed on the one or more assets identified at step 402. After evaluating the asset, such as a patent or a set of patents in a patent portfolio, a transaction record is created in order to log or archive the asset valuation event, at step 408. Such a log may be used to keep track of the number of "hits" to the web page or may be used to record more detailed information to allow for detailed billing to users or detailed presentation to advertisement agencies to derive advertising revenue from the web site. Payment for services on the web cite may be by monthly billable process, e-cash, passing of a secure credit card number, etc. In another form, a model may be set up on the web page such that revenue is derived from banner advertising where user access is made without charge. In any event, some sort of transaction record is stored for a desired business purpose. Concurrent with record retention or after record generation is complete, the results of the valuation are immediately, periodically, or routinely communicated to the end user at step 410. Such communication may be by electronic mail, facsimile, wireless transfer, telephone communication or any other like communication methodology.

Figure 5:
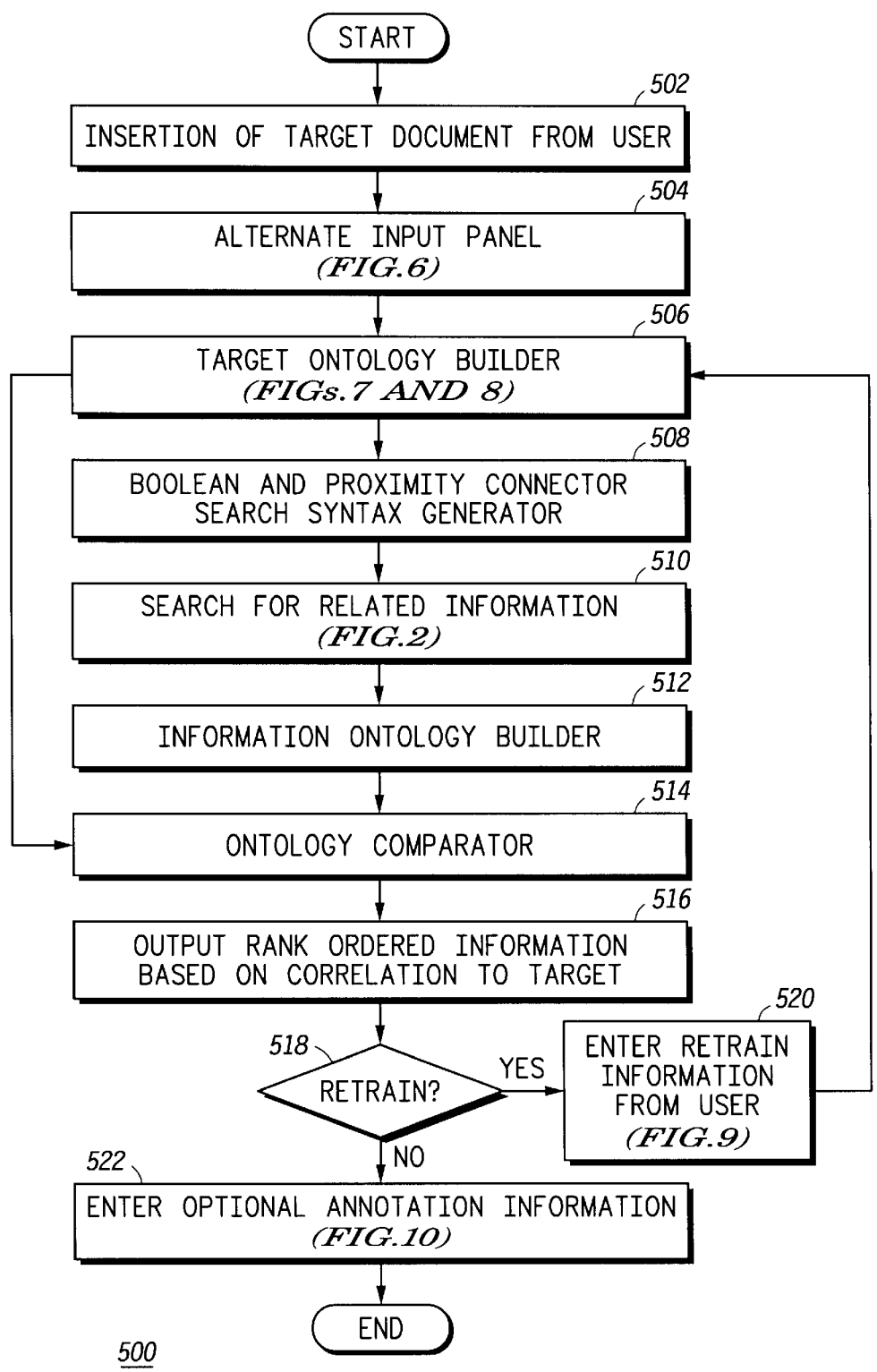
FIG. 5 illustrates, in a flowchart, a method for finding correlating information related to an asset (e.g., infringement or invalidity references related to a patent) from one or more computer readable locations over a network or local computer system.

Referring to FIG. 5, an illustrative method of searching for information that correlates to a user document is illustrated. The method 500 includes a step of inserting a target document or document ID from a user via step 502. The target document may be any document containing information that the user wishes to search against an internal or external database. An example of a target document is an issued patent or patent application. Where the target document is an issued patent or other document that contains patent content, the method 500 may be used to indicate or provide either prior art information from the public domain that may be used to invalidate or to evaluate validity of the patent, or may be information that may indicate whether or not the patent is infringed or used by others. Next, alternate information may be input by a user at step 504 via a GUI further described with respect to FIG. 6. The alternate input panel of FIG. 6 may be used by the user to further customize the search based upon the asset. For example, while the input document may have various technical terms, the input panel may be used to add synonyms or other related search terms that will further enhance the effectiveness of the search.

A target ontology builder step 506 creates an ontology based on: (1) the target document or target ID provided from the user; and (2) information from the alternate input panel (which is optional). An example of a target document and a corresponding ontology created by the ontology builder is described with respect to FIG. 7 and FIG. 8. The ontology from the ontology builder is then provided to a boolean and proximity connector search syntax generator, via step 508. The boolean and search term generator takes the ontology from the ontology builder and produces search terms that may be used to perform a search of a variety of databases and information sources. An example of a search term derived from FIGS. 7 and 8 may be: (picocell w(3) technology) w(s) (private or w-atm) and SDMA where w(N) means to find the terms within N words of each other and w(s) means find the terms in the same sentence, etc. Note that the syntax of the search term may vary greatly depending upon the commercial or proprietary search tool used.

A search of the available information using the search terms is then performed, at step 510. A computing system, such as system 200, may be used to perform such a search. In the particular embodiment of the system 200, information from the general purpose computer 202, a local data base or server 212, a local disk 222, an intranet database 220, an extranet database 218, an internet database 214, or a wireless network/database 216 may be searched using the search terms from the connector search syntax generator 508. The search may be performed by a computer using an intelligent agent with access to available information and databases, such as those described with reference to FIG. 2. Once information from the various search sources is retrieved, the data and information from these sources is then translated and reformatted into an ontology by an information ontology builder using semantic analysis, at step 512.

At step 514, the original ontology from the ontology builder 506 is compared and correlated with the one or more information ontologies derived from the ontology building, at step 512. An example of an illustrative ontology comparator that may be used when performing such a search and correlation is described in Natural Language Understanding second edition by James Allen (1995). After performing the ontology comparison, rank ordered information is then output based on the correlation between the information retrieved from the various databases and other sources and the original target ontology via step 516 (content similar to FIG. 9 or FIG. 3 for example).

A determination is then made, at decision step 518, whether to retrain the search agent and/or to modify the ontology to further enhance or further refine the search results. If retraining is desired then processing continues to step 520 where the user enters retraining information. The types of information and user interface used for one type of retraining methodology is further described with respect to FIG. 9. In this event, upon completion of the reception of retraining information, processing then continues back at step 506 in order to further obtain correlation information from computer readable media over time.

When retraining is not desired, processing continues to step 522, where optional annotation information may be entered by a user for subsequent data review by human users. The optional annotation information and an illustrative user interface for inputting such information is further disclosed below with reference to FIG. 10. The method of searching and correlating information between the target document and the external information source is then completed.

When the target document is a patent and when the information searched has dates prior to the filing date of the patent application or resulting patent, the output rank-ordered information produced at step 516 may then be used to evaluate the validity or claim scope of the target patent. Such information may be useful in determining claim interpretation, validity, and the like for licensing assertions or law suits. In another application where the target document is a patent and the information searched has dates after the filing date of the patent, the output rank-ordered information may be reviewed to identify potential users/infringers of the patented technology. Thus, the method 500 described with respect to FIG. 5, may be used either as an invalidity evaluation tool or infringement evaluation tool for a patent document containing patent content.

Figure 6:
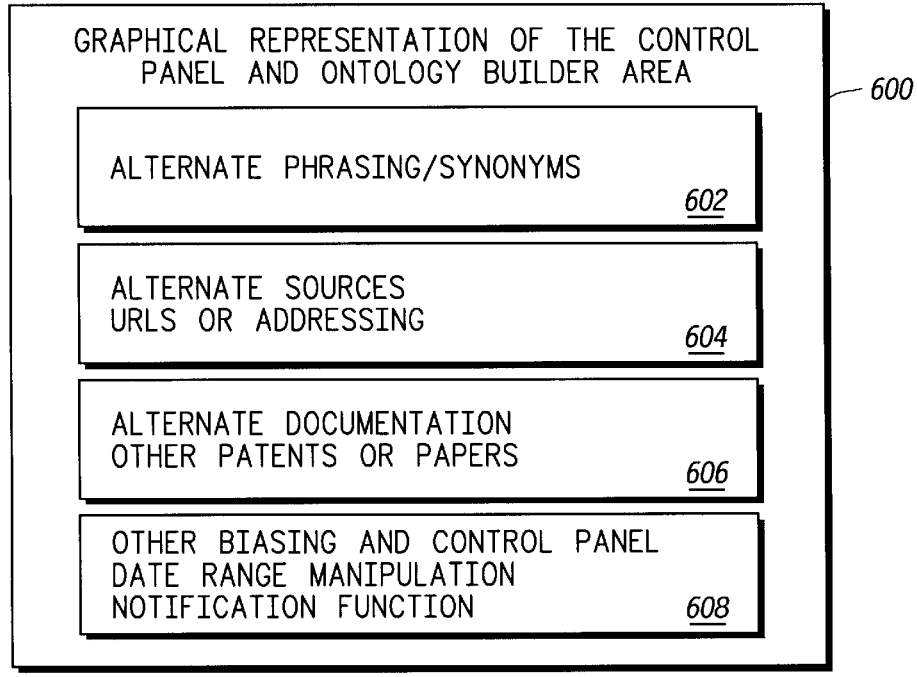
FIG. 6 illustrates, in a block diagram, a computer graphical user interface (GUI) arrangement that may be used to enter alternate search information for use by the method of FIG. 5.

Referring to FIG. 6, a display screen 600 is illustrated. The display includes a plurality of fields that may be shown to a user. The display 600 includes a first field 602 where alternate phrasing or synonyms for various terms in the asset may be input by the user. As an example, the asset or patent may comprise the parsed term "transistor". The user, through his knowledge base, may know that a transistor in the IC industry may also be referred to as a switch, an active device, a MOSFET, a bipolar device, a JFET, a MIS device, and so on. The human user can input these synonyms or similar terms on a case-by-case basis, or the computer can create a synonym database from past user input so that the next time transistor is encountered by the method, the region 602 of FIG. 6 automatically accommodates previously entered synonyms or similar terminology.

The display 600 also includes a second field 604 where alternate sources of searchable information identified by addresses or Universal Resource Locators (URLs) may optionally be inserted by the user. If a special, yet unusual, computer readable source of information is likely to contain very valuable information on the value of the asset, this field may be used to direct the method directly to this desired source of data.

The display 600 may also include field 606 where alternate documentation such as other patents, papers, or other sources may be identified for searching. In addition, the display 600 may show an entry field 608 that allows biasing and control panel information, such as date ranges that may be manipulated or searched by the search engine. The date range field refines the information searched to a particular set of dates within a range (e.g., Jan. 23, 1992 through Dec. 23, 1998). For a patent, information before or after a critical date (such as a filing date or issuance date) may be focused on in order to reduce and refine the scope of information searched.

In addition, a notification function may be enabled and customized by the user. Generally, the search and valuation method described herein may consume a significant amount of time and computing power. The notification function may allow a user to go offline and perform other activities and be notified or interrupted later by the method when the method encounters a particular event or condition. For example, a user may wish to review the results of a search after a selected number of pertinent documents have been identified. Alternatively, a user may wish to be notified after a document is found to have a certain correlation or value. One may notify the user once every 24 hours of the search progress. Maybe the user is only looking for correlation references or data related to the asset that were promulgated by a specific target competitor. In this case, the user would only ask to be notified by email, phone, or fax by the computer when a reference "hit" was associated with the target competitor. Many other potential events that could trigger notice also exist.

Figures 8, 9:
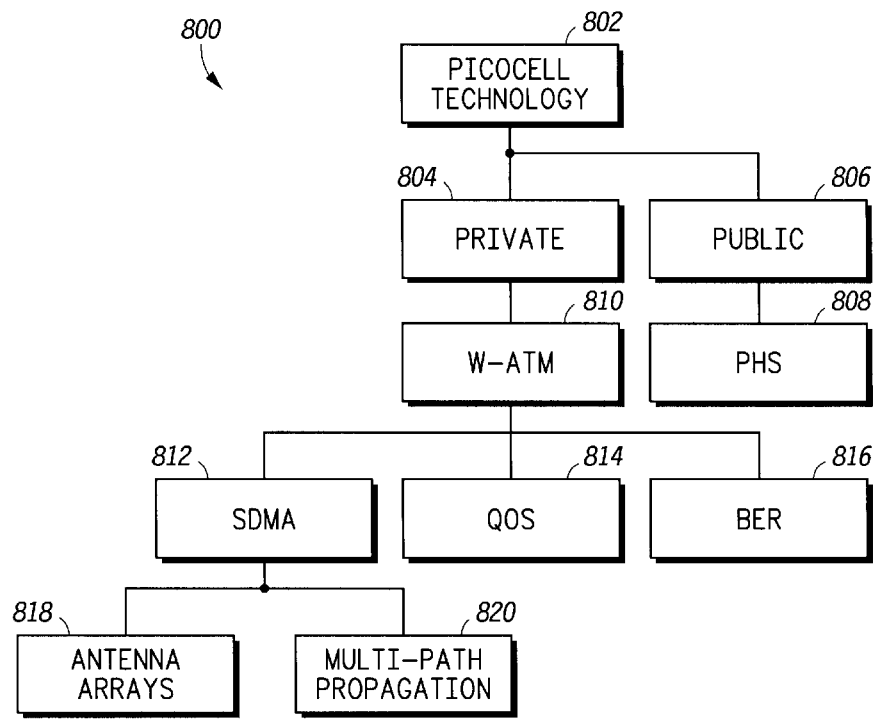
FIG. 8 illustrates, in a tree data structure, an ontology that is built from the document of FIG. 7 to enable a computerized search for correlating information.
FIG. 9 illustrates, in a table, a rank-ordered output of illustrative correlating information from using the method of FIG. 5.

Referring to FIG. 7, a sample portion of a target document/patent including text that is to be searched is illustrated. The input information may be any text, and in the case of a patent is a claim, a summary, the whole patent, or the like. The material of FIG. 7 is one example of material input and processed by the steps 502–506 of FIG. 5. FIG. 8 shows an ontology tree-based data structure that was produced by mapping the target document shown in FIG. 7 to a data structure using an ontology builder. An ontology builder is generally a text parser that understands sentence structure and grammar, paragraph or overall document structure, and the grammatical relationship between words in a paragraph or sentence. With this capability, the ontology builder can parse the terminology within a target patent, determine relationships between terms in the patent, and determine which terms in the patent are more dominant than others.

Once the ontology of FIG. 8 is built, at step 506 of FIG. 5, an optional step may be to present the structure of FIG. 8 to the user on a computer screen or printout. The user can make additions, deletions, and adjustments in the order, content, and relationships of the elements in the ontology based upon an assessment of the asset. The ontology may then be used to search vast computer readable content or data, references, news, documents, and like material related to the derived ontology of FIG. 8 (see steps 508–510 of FIG. 5).

Referring to FIG. 9, an example of resulting user displayed information after performing a search via FIG. 5 is illustrated. The displayed information 900 includes a list of retrieved documents, such as potentially invalidating or infringing references, a relevance ranking 902, a user ranking 904 and other optional information fields 906. In this particular illustrative example, the target document input from the user is labeled Patent A. Of course, the search engine is likely to find the target document itself on the computer readable media and find a high correlation of the target document to itself. Thus, the first entry in the displayed information table 900 is the target document Patent A. The relevance ranking for Patent A is 1.000, which is the highest correlation rank possible in this embodiment.

The relevance ranking is a correlation indicator between a comparison of the ontology for the target document and an ontology created for the listed document. The table indicates that a technical paper (e.g., IEEE IEDM paper) shows an ontology very similar to the ontology of the target document. This means that if the date of this technical paper precedes the filing date of the patent, that the technical paper may be investigated as a potential invalidating reference for the target patent. If the date of the technical paper is after the patent, the technical paper may be evidence of a trail of infringement and can be evaluated by the corporation's patent counsel.

The user ranking illustration of column 904 allows a user to adjust the correlation to focus the search engine and ontology builders on different and potentially more useful sources. In FIG. 9, the user ranking is on a scale of from 1 to 3 where 3 is the most correlated value (highest value) and 1 is the lowest correlation value (lowest value). Other user ranking methods may be used, such as a binary method or a wider range numerical ranking system, such as 1 to 10. In FIG. 9, the user has reviewed nine documents produced by the method of FIG. 5. In that review, the user determined that the references marked 3 in column 904 were of substantial interest. The method of FIG. 5 may then be re-executed to analyze these high ranking references with respect to the ontology of the target patent and adjust its method to find more references similar to the references marked as user ranking=3 in FIG. 9. Therefore, the user ranking may be used to adjust the method of FIG. 5 in more useful directions based upon existing search results and user direction.

In addition to correlation, the user may rank the documents based or other criteria, such as company owner, date, perceived importance, or other factors. This information is handled by one or more other information fields 906 in FIG. 9. FIG. 9 illustrates that the retrieved information is presented below the target document Patent A in descending order and sorted based on the relevance ranking. The references with the highest relevance ranking are listed first down to the least relevant ranking which are listed at the bottom of the display. In the particular example of FIG. 9 various technical papers, patents, data books, and other information sources such as news articles, SEC filings, data books of competitors web sites, IEEE industry standard documents, and the like are listed. It is important to note that the content of FIG. 9 may be rank ordered by another criterion.

Figure 10:
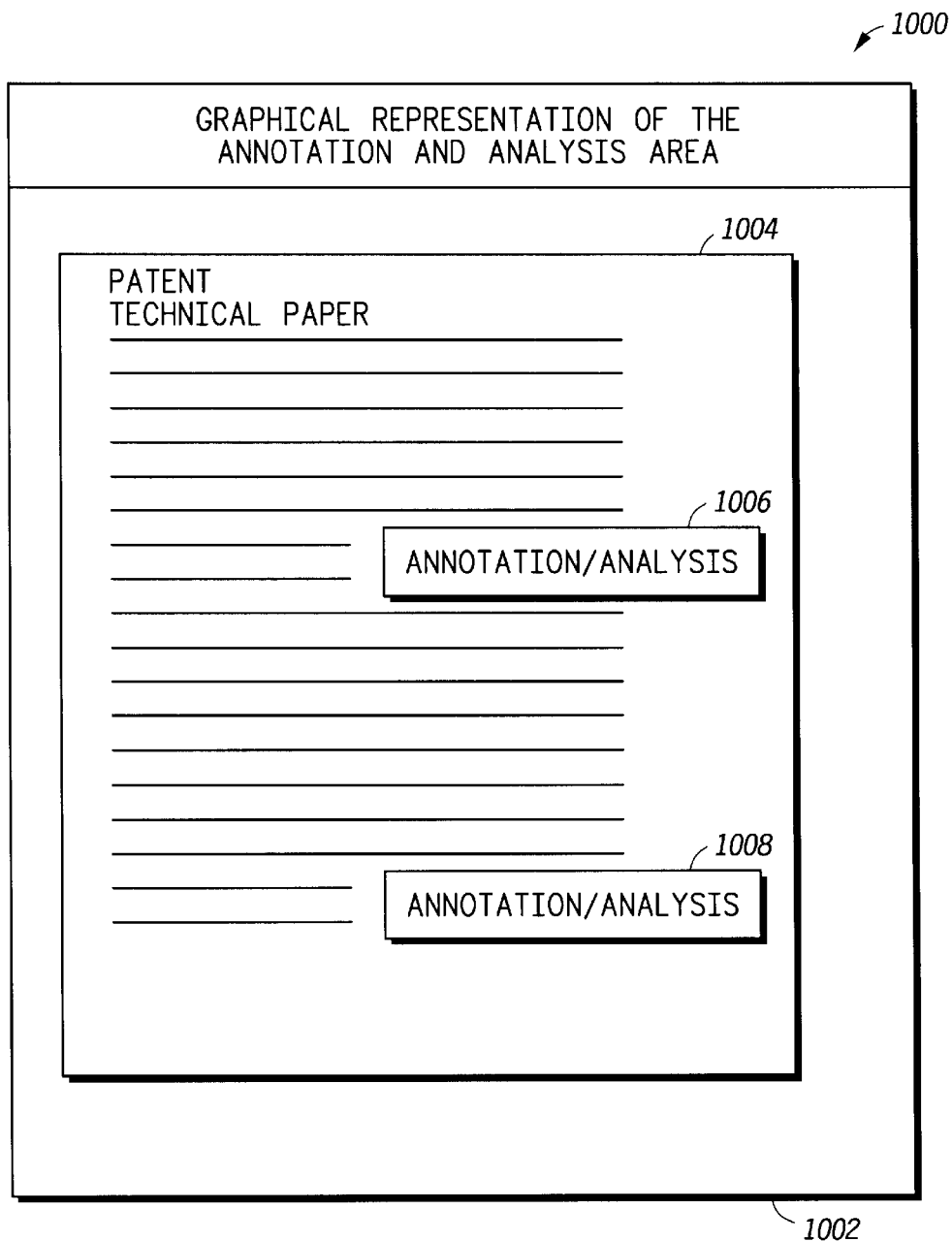
FIG. 10 illustrates, in a block diagram, annotation regions placed into a correlating document via an annotation function of the method of FIG. 5.

Referring to FIG. 10, a document 1000 that was found by searching with the method of FIG. 5 is illustrated. Step 522 of FIG. 5 allows user annotation of the reference 1000 to assist other users and viewers of the information over time.

A display 1002 includes an information field 1004 which has various subfields 1006, 1008. The field 1004 generally includes the content of a particular patent or technical paper and the subfields 1006 and 1008 include an area where a user can make particular annotations, drawings, claim chart content, opinions, or comments regarding the particular reference shown. The information entered by the user in such sub fields 1006, 1008, may then be inserted into a database which is linked to a particular ontology or search result. In some applications, the ontology built along with the particular annotations of the user may be shared via a computer network to other users such that various users comments and searching work may be shared. This sharing of comments and content by annotations should reduce redundant work and improve efficiency of communication on joint searching projects involving many complex patents.

The methods of searching and processing information illustrated with respect to FIGS. 5–10 may be implemented as a software program with instructions that are executed on a general purpose computer, such as computer 202 of system 200. The computer 202 may operate on a stand alone single user basis, or may be a server that may handle many user search requests. In addition, the software executing on a computer server may be a subscriber based program available at one or many computers on a computer database, that is accessible on a fee-based and transaction based system for selected and authorized customers. In such network based electronic commerce applications, a user may first sign up for a service and possibly pay a subscription fee or agree to an alternative revenue or contractual relationship, and be granted a password. The user, if authorized, may access via an electronic network, such as the internet, a server having the software to implement the search method described with referenced in FIGS. 5–10. The user then may remotely identify and interact with the software on the remote server to input target documents, search available information, customize the user search via the alternate input panel, add annotation information, and/or alternatively retrain and further search the available database in other sites to gather information correlated with the users target document. In this manner, a computer acting as a server may be a shared resource for many users across a wide area of locations to allow shared access to the searchable tool described above.

Although the present invention has been described with reference to specific embodiment(s), further modifications and improvements will occur to those skilled in the art. For example, the ontology herein may be based on a different type of data structure other than a tree structure, such as a hash table, a linked list, a binary decision diagram (BDD), etc. It is to be understood therefore, that the invention encompasses all such modifications and variants to the extent of the scope of the appended claims and their equivalents.

What is claimed is:

1. A method for producing correlating information with respect to a target document, the method comprising the steps of:
   providing a target document, the target document including patent content;
   processing the target document to obtain an information structure, wherein said information structure comprises a tree structure ontology;
   producing a search criteria from the information structure;
   searching computer readable media based upon the search criteria to obtain search material; and
   comparing the search material to contents of the target document to produce the correlating information.

2. The method of claim 1 wherein the target document is selected from the group consisting of a portion of the specification content of the target document, a complete patent document, and one or more claims from the target document.

3. The method of claim 1 wherein the target document is the information structure wherein the step of processing the target document accepts the target document as the information structure.

4. The method of claim 1 wherein the nodes of the tree structure ontology contain content from the target document.

5. The method of claim 1 wherein the tree structure ontology is more than one level in depth.

6. The method of claim 1 wherein the tree structure ontology is created from natural language processing or semantic processing of the target document.

7. The method of claim 1 wherein the tree structure ontology is created at least in part with human user intervention.

8. The method of claim 1 wherein the tree structure ontology is modified to build a second ontology that maintains certain criteria and parameters from the tree structure ontology.

9. The method of claim 1 wherein the step of searching is performed by generating a search request from the information structure and using the search request to search the computer readable medium.

10. The method of claim 9 wherein the computer readable medium is a database or is accessible by an electronic network.

11. The method of claim 9 wherein the search request is used to search publicly available documents.

12. The method of claim 1 wherein the step of comparing comprises generating one or more ontologies from each reference in the search material and comparing the ontologies to the information structure.

13. The method of claim 1 further comprising evaluating the correlating information with respect to claims of the target document.

14. The method of claim 1 further comprising evaluating the correlating information with respect to claims of the target document for validity or infringement analysis.

15. The method of claim 1 further comprising evaluating the correlating information with respect to claims of the target document for patentability analysis wherein the target document is a disclosure of an invention.

16. The method of claim 1 further comprising evaluating the correlating information with respect to claims of the target document to locate prior art related to the target document.

17. The method of claim 1 wherein the correlating information is rank ordered according to correlation weight.

18. The method of claim 1 wherein the information structure incorporates additional input provided by a user.

19. The method of claim 18 wherein the additional input is information selected from alternate phrases and alternate documentation.

20. The method of claim 1 wherein searchable sources within the computer readable medium are prioritized based upon user input.

21. The method of claim 1 wherein the search material is filtered based upon a user selected date range.

22. The method of claim 1 wherein a user is notified of availability of correlating information based upon a selected criterion.

23. The method of claim 1 wherein the information structure may be modified by a user after production of the correlating information.

24. The method of claim 23 wherein the information structure is modified by a user inputting new rank information of the correlating information.

25. The method of claim 1 wherein the correlating information is annotated by a user.

* * * * *